Patented Apr. 17, 1945

2,373,700

UNITED STATES PATENT OFFICE 2,373,700

AZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application June 29, 1940, Serial No. 343,264

10 Claims. (Cl. 260—205)

This invention relates to new azo dye compounds and their application to the art of coloring.

We have discovered that the azo compounds having the general formula:

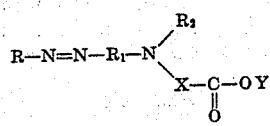

wherein R represents the residue of a member selected from the group consisting of a benzene, a naphthalene, a benzoxazole and a benzothiazole nucleus, $R_1$ represents the residue of a member selected from the group consisting of a benzene and a naphthalene nucleus containing but one benzene and naphthalene ring, respectively, $R_2$ represents a member selected from the group consisting of hydrogen, an aliphatic group, a cycloalkyl group, a furyl group, a phenyl nucleus and a

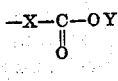

group, X represents a short chain saturated aliphatic hydrocarbon group, Y represents a member selected from the group consisting of an aliphatic, a furyl and a phenyl nucleus and wherein the

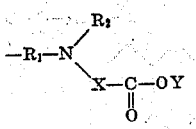

group is attached to the nucleus represented by $R_1$ in para position to the azo bond shown constitute a valuable class of dye compounds. Depending upon their structure, the azo compounds of our invention possess application for the coloration of organic derivatives of cellulose, silk and wool. Coloration can be effected by dyeing, printing, stenciling or like methods.

While our invention relates broadly to azo compounds having the formula above given, it relates more particularly to those compounds wherein R and $R_1$ are benzene nuclei, $R_2$ is hydrogen or alkyl and Y is alkyl. Ordinarily, X is a saturated aliphatic hydrocarbon chain containing 1–4 inclusive carbon atoms and normally it is a methylene group.

Both sulfonated and non-sulfonated compounds are included within the scope of our invention. The nuclear non-sulfonated compounds have been found to be especially of value for the dyeing of organic derivatives of cellulose and it is to these compounds and their application for the dyeing of organic derivatives of cellulose that our invention is particularly directed. The nuclear non-sulfonated compounds likewise possess some application for the dyeing of wool and silk. For the dyeing of organic derivatives of cellulose, such as cellulose acetate silk, nuclear non-sulfonated dye compounds wherein R and $R_1$ are benzene nuclei are generally advantageous.

The nuclear sulfonated compounds of our invention have little or no utility for the dyeing of organic derivatives of cellulose but possess application for the dyeing of wool and silk. Preferably when the dye compounds of our invention are to be employed for the dyeing of organic derivatives of cellulose they should contain no nuclear free carboxylic acid group. Red, yellow, orange-yellow, orange-red, greenish-blue, blue and violet dyeings, for example, can be obtained employing the dye compounds of our invention.

It is an object of our invention to provide a new class of azo dye compounds suitable for the coloration of organic derivatives of cellulose, wool and silk. Another object of our invention is to provide a process for the coloration of organic derivatives of cellulose, wool and silk. A further object is to provide colored textile materials which are of good fastness to light and washing. A particular object of our invention is to provide a new class of nuclear non-sulfonated azo dyes suitable for the coloration of cellulose acetate silk. Other objects will hereinafter appear.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate and the cellulose ethers such as methyl cellulose, ethyl cellulose or benzyl cellulose. While our invention will be illustrated more particularly in connection with the coloration of cellulose acetate silk, a material to which the invention is especially adapted, it will be understood that it applies to the coloration of other organic derivatives of cellulose such as those just named as well as to the coloration of wool and silk.

The azo dye compounds of our invention can be prepared by diazotizing diazotizable members selected from the group consisting of an arylamine of the benzene series, an aminonaphthalene, an aminobenzothiazole and an aminobenzoxazole and coupling the diazonium compounds obtained with the coupling compounds having the general formula:

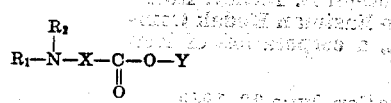

wherein $R_1$, $R_2$, X and Y have the meaning previously assigned to them.

It will be understood that the term "aliphatic" as used herein includes unsubstituted alkyl groups such as a methyl group, an ethyl group, a propyl group or a butyl group, as well as substituted alkyl groups such as β-hydroxyethyl, β-hydroxypropyl, β,γ-dihydroxypropyl, γ-hydroxypropyl, β-methoxyethyl, β-ethoxyethyl, β-sulfoethyl and the alkyl esters of the hydroxyalkyl groups named, for example. The term "aliphatic" also includes unsaturated groups such as allyl, —CH$_2$CH$_2$CH=CH$_2$ and —CH$_2$CH$_2$CH$_2$CH=CH$_2$ for example. Illustrative of cycloalkyl groups may be mentioned cyclobutyl, cyclohexyl, and cycloheptyl. Similarly, illustrative of furyl may be mentioned a furyl radical such as furfuryl, tetrahydrofurfuryl, 5-ethylfuryl and 5-β-hydroxyethyltetrahydrofurfuryl.

The nuclei represented by R and $R_1$ can be substituted or unsubstituted. These nuclei can be substituted, for example, with the substituent groups customarily appearing on such nuclei. As is understood in the art these nuclei can be substituted with substituents such as a nitro group, a halogen atom, an alkyl group, an alkoxy group, a hydroxy group, a cyano group, a sulfonic acid group, a carboxylic acid group and an acyl group. The substituents named are intended to be illustrative and not limitative of those that may be substituted on the nuclei in question.

The following examples illustrate the preparation of the azo dye compounds of our invention:

*Example 1*

12.8 grams of o-chloroaniline are dissolved in 150 cc. of water to which has been added 25 cc. of 36% hydrochloric acid. The resulting solution is cooled to a temperature approximating 0–5° C. by the addition of ice, for example, and the amine is diazotized by the addition with stirring of 6.9 grams of sodium nitrite dissolved in water. Throughout the diazotization reaction which takes place the reaction mixture is maintained in a cooled condition.

17.9 grams of m-methylphenyl glycine methyl ester,

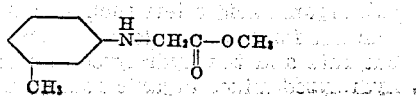

are dissolved in a dilute aqueous hydrochloric acid solution and the resulting solution is cooled to a temperature approximately 0–10° C. The diazonium solution prepared as described above is then added, with stirring, while maintaining the reaction mixture in a cooled condition.

After the addition of the diazonium solution the reaction mixture is permitted to stand for a short time following which it is slowly made neutral to Congo-red paper by the addition of sodium acetate. Upon completion of the coupling reaction which takes place, the dye compound formed is recovered by filtration, washed with water and dried. The dye compound obtained colors cellulose acetate silk yellow.

*Example 2*

13.5 grams of p-aminoacetophenone are diazotized and the diazonium compound obtained is coupled with 22 grams of

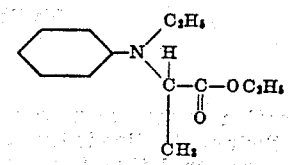

Coupling and recovery of the dye compound formed can be carried out in accordance with the procedure described in Example 1. The dye compound obtained colors cellulose acetate silk orange.

*Example 3*

13.8 grams of p-nitroaniline are diazotized and the diazonium compound obtained is coupled with 31.1 grams of

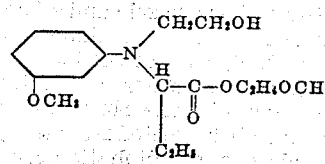

Coupling and recovery of the dye compound formed can be carried out in accordance with the procedure described in Example 1. The dye compound obtained colors cellulose acetate silk red.

*Example 4*

21.7 grams of 1-amino-2-bromo-4-nitrobenzene are diazotized and the diazonium compound obtained is coupled with 23.1 grams of

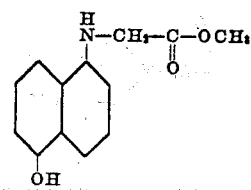

Coupling and recovery of the dye compound formed can be carried out in accordance with the procedure described in Example 1. The dye compound obtained colors cellulose acetate silk blue.

*Example 5*

15.4 grams of 1-amino-2-hydroxy-4-nitrobenzene are diazotized and the diazonium compound obtained is coupled with an equivalent gram molecular weight of

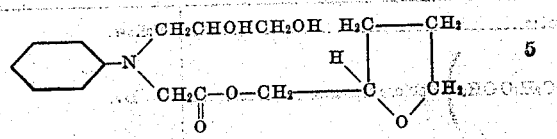

The dye compound obtained colors cellulose acetate silk red.

Example 6

18 grams of 6-methoxy-2-aminobenzothiazole,

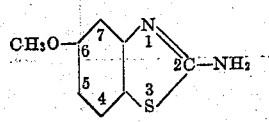

are diazotized in known fashion and the diazonium compound obtained is coupled with 27.1 grams of

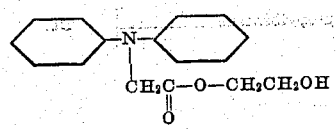

Coupling can be carried out in an acetic acid solution followed by neutralization of the reaction mixture with sodium carbonate. When coupling is complete water is added to the reaction mixture and the dye compound formed is recovered by filtration, washed with water and dried. The dye compound obtained colors cellulose acetate silk orange.

Example 7

16.4 grams of 6-methoxy-2-aminobenzoxazole are diazotized in known fashion and the diazonium compound obtained is coupled with 30.3 grams of

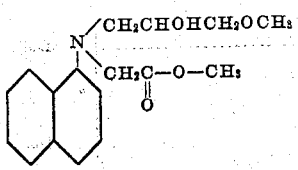

The dye compound obtained colors cellulose acetate silk a wine shade.

Example 8

18.3 grams of 1-amino-2,4-dinitrobenzene are diazotized and the diazonium compound obtained is coupled with 28.7 grams of

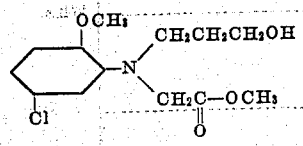

Coupling can be carried out in a cold dilute hydrochloric acid solution in the usual manner. The dye compound obtained colors cellulose acetate silk rubine.

Example 9

33.2 grams of

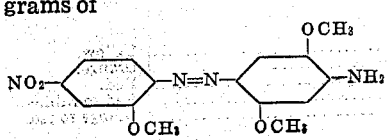

are diazotized and the diazonium compound obtained is coupled with 26.5 grams of

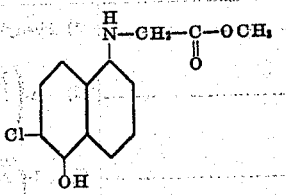

The dye compound obtained colors cellulose acetate silk blue.

Example 10

24.4 grams of dianisidine are diazotized and the diazonium compound obtained is coupled with 26.8 grams of

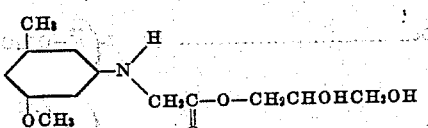

The dye compound obtained colors cellulose acetate silk red.

Example 11

1 gram mole of 2-amino-3,5-dinitrobenzene sulfonethylamide is diazotized and the diazonium compound obtained is coupled with 1 gram mole of

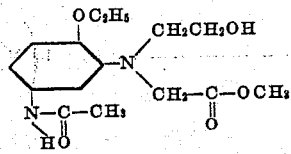

The dye compound obtained colors cellulose acetate silk blue.

Example 12

1 gram mole of p-nitroaniline is diazotized and the diazonium compound obtained is coupled with 1 gram mole of

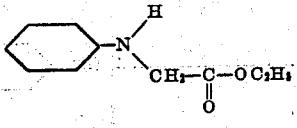

The dye compound obtained colors cellulose acetate silk orange.

By the substitution of 1 gram mole of

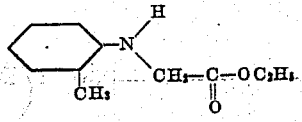

for the coupling component of the example a dye compound is obtained which similarly colors cellulose acetate silk orange.

The following tabulation further illustrates the compounds included within the scope of our invention together with the colors they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described hereinbefore.

| Amine | Coupling component | Color |
|---|---|---|
| Aniline | (1) Phenyl glycine methyl ester | Yellow. |
| Do | (2) 1-(N(H)(C₂H₅)–CH–C(=O)–O–C₂H₄OCH₃)-2-chlorobenzene | Do. |
| Do | (3) 1-(N(H)–CH₂–C(=O)–OCH₃)-2-methoxy-5-methylbenzene | Do. |
| Do | (4) 1-(N(H)–CH₂–C(=O)–OC₂H₄OH)-2-methylbenzene | Do. |
| Do | (5) 1-(N(H)–CH₂–C(=O)–O–phenyl)-benzene | Do. |
| Do | (6) 1-(N(H)–CH₂CH₂CH₂–C(=O)–OCH₃)-benzene | Do. |
| Do | (7) 1-(N(allyl)(CH₂–C(=O)–OCH₃))-2-methyl-5-isopropylbenzene | Do. |
| Do | (8) 1-(N(CH₂CH₂OH)(C(H)(C₂H₅)–C(=O)–OC₂H₄OH))-3-bromobenzene | Do. |
| Do | (9) 1-(N(tetrahydrofurfuryl)(CH₂C(=O)OCH₃))-2-methoxy-5-chlorobenzene | Do. |
| Do | (10) 1-(N(cyclohexyl)(CH₂C(=O)OCH₃))-benzene | Do. |
| Do | (11) phenyl-N(CH₂–C(=O)–OCH₃)₂ | Do. |
| Do | (12) phenyl-N(CH₂–C(=O)–OC₂H₅)(CH₂–C(=O)–OCH₃) | Do. |
| Do | (13) phenyl-N(CH₂–C(=O)–OCH₃)(CH(CH₃)–C(=O)–OCH₃) | Do. |
| Do | (14) 1-(N(H)–CH₂C(=O)OCH₃)-naphthalene | Wine. |
| Do | (15) 1-(N(C₂H₅)–CH₂–C(=O)–OC₂H₅)-naphthalene | Do. |
| Do | (16) 1-(N(CH₂CH₂OH)–CH₂C(=O)–OCH₃)-5-hydroxynaphthalene | Blue. |
| Do | (17) 1-(N(H)–CH₂C(=O)–OC₂H₄OH)-5-hydroxy-6-bromonaphthalene | Do. |
| o-Chloroaniline | 1 to 13 above | Yellow. |
| p-Aminoacetophenone | do | Orange. |
| p-Nitroaniline | do | Red. |
| 1-amino-2-bromo-4-nitrobenzene | do | Red to rubine. |
| o-Nitroaniline | do | Orange to red. |

| Amine | Coupling component | Color |
|---|---|---|
| m-Aminobenzamide | 1 to 7 above | Yellow. |
| 2,4-dichloroaniline | do | Yellow to orange-yellow. |
| 2,4-diiodoaniline | do | Do. |
| 1-amino-2-methoxy-4-nitrobenzene | 7 to 13 above | Red. |
| 2,4-dinitroaniline | 1 to 13 above | Rubine to purple. |
| 1-amino-2,4-dinitro-6-(Cl, Br) benzene. | do | Rubine to violet. |
| 1-amino-2,4-dinitro-6-cyanoaniline | 7 to 13 above | Wine to violet. |
| m-Nitroaniline | do | Orange-yellow. |
| 1-amino-4-nitro-naphthalene | 1 to 13 above | Red to rubine. |
| 2-amino-6-methoxy-benzoxazole | do | Rubine to purple. |
| Do | 14 to 15 above | Wine. |
| Do | 16 to 17 above | Blue. |
| 2-amino-6-methoxy-benzothiazole | 1 to 13 above | Rubine to purple. |
| Do | 14 to 15 above | Purple. |
| Do | 16 to 17 above | Blue. |
| 2,4-dinitroaniline | 14 to 15 above | Violet. |
| Do | 16 to 17 above | Greenish-blue. |
| 1-amino-2-aceto-4-nitrobenzene | 1 to 13 above | Orange-red. |
| 1-amino-2-($C_2H_5C{-}\atop O$)-4-nitrobenzene. | do | Do. |
| 1-amino-2-methyl-4-nitrobenzene | do | Red. |
| 5-nitro-2-aminophenylethylsulfone | 14 to 15 above | Wine to blue. |
| 5-nitro-2-aminobenzene sulfonamide | 14 to 15 above | Wine. |
| Do | 16 to 17 above | Blue. |
| 5-nitro-2-aminophenylmethyl sulfone. | 14 to 15 above | Wine. |
| Do | 16 to 17 above | Blue. |
| 1-amino-2-cyano-4-nitrobenzene | 14 to 15 above | Wine. |
| Do | 16 to 17 above | Blue. |
| 3,5-dinitro-4-aminophenylmethyl ketone. | 14 to 15 above | Purple. |
| Do | 16 to 17 above | Blue. |
| 2,4,6-trinitroaniline | 14 to 17 above | Greenish-blue. |

While the application of the nuclear non-sulfonated dye compounds of our invention has been described more particularly in connection with the coloration of cellulose acetate silk, it will be understood that these dye compounds yield generally similar shades on other organic derivatives of cellulose as well as wool and silk.

Nuclear sulfonated compounds of our invention can be prepared by sulfonation of the nuclear non-sulfonated compounds in accordance with known sulfonation methods or by the use of previously sulfonated components. Suitable sulfonated amines that can be diazotized and employed in the preparation of compounds of our invention include, for example, p-sulfanilic acid, 1-amino-4-sulfonic naphthalene, 2-naphthylamine-8-sulfonic acid, 1-naphthylamine-3-sulfonic acid, 1-naphthylamine-5-sulfonic acid, 1-naphthylamine-6-sulfonic acid, 1-naphthylamine-4,8-disulfonic acid, 1-naphthylamine-3,8-disulfonic acid, 1-amino-5-naphthol-7-sulfonic acid, metanilic acid, 1-amino-2-sulfonic-4-nitrobenzene, 1-amino-2,4-disulfonic benzene and 1-amino-2-chloro-4-sulfonic benzene.

Although a large number of examples of dye compounds have been given, it is to be understood that these examples are illustrative and not limitative of our invention. Any of the diazo components shown herein, for example, can be coupled with any of the coupling components shown to give compounds included within the scope of our invention.

In order that the preparation of the compounds of our invention may be entirely clear, it is here noted that the coupling components employed in their preparation can be prepared after the general methods described in the prior art. Illustrative of the prior art methods may be mentioned Beilstein, vol. 12, pages 468 to 474, inclusive; Berichte der Deutschen Chemischen Gesellschaft, vol. 8, pages 1156 and 1157 (1875); J. Praktische Chemie, vol. 38, pages 436 and 437, and Comptes Rendus, vol. 145, page 126. While all of the possible types of coupling components that can be employed in the preparation of the compounds of our invention are not described in the prior art references just mentioned, it will be understood that the types not described can be prepared by methods analogous to those employed in the preparation of the types described.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivative of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. The azo dye compounds having the general formula:

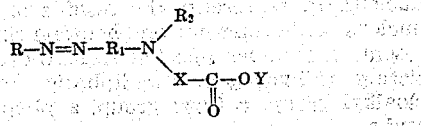

wherein R represents the residue of a member selected from the group consisting of a benzene, a naphthalene, benzoxazole and a benzothiazole nucleus, $R_1$ represents the residue of a member selected from the group consisting of a benzene and a naphthalene nucleus containing but one benzene and naphthalene ring, respectively, $R_2$ represents a member selected from the group consisting of hydrogen, an aliphatic group, a cycloalkyl group, a furyl group, a phenyl nucleus and a

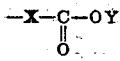

group, X represents a short chain saturated aliphatic hydrocarbon group, Y represents a member selected from the group consisting of a hydrocarbon alkyl, a furyl and a phenyl nucleus and wherein the

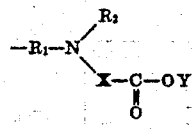

group is attached to the nucleus represented by $R_1$ in para position to the azo bond shown.

2. An organic derivative of cellulose colored with a nuclear non-sulfonated azo dye compound having the general formula:

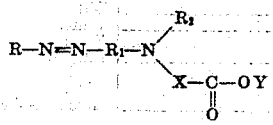

wherein R represents the residue of a member selected from the group consisting of a benzene, a naphthalene, a benzoxazole and a benzothiazole nucleus, $R_1$ represents the residue of a member selected from the group consisting of a benzene and a naphthalene nucleus containing but one benzene and naphthalene ring, respectively, $R_2$ represents a member selected from the group consisting of hydrogen, an aliphatic group, a cycloalkyl group, a furyl group, a phenyl nucleus and a

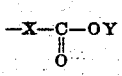

group, X represents a short chain saturated aliphatic hydrocarbon group, Y represents a member selected from the group consisting of a hydrocarbon alkyl, a furyl and a phenyl nucleus and wherein the

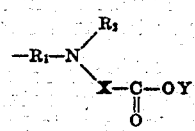

group is attached to the nucleus represented by $R_1$ in para position to the azo bond shown.

3. An organic derivative of cellulose colored with a nuclear non-sulfonated azo dye compound having the general formula:

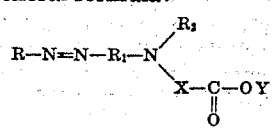

wherein R represents the residue of a benzene nucleus, $R_1$ represents the residue of a benzene nucleus containing but one benzene ring, $R_2$ represents a member selected from the group consisting of hydrogen, an aliphatic group, a cycloalkyl group, a furyl group, a phenyl nucleus and a

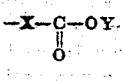

group, X represents a short chain saturated aliphatic hydrocarbon group, Y represents a member selected from the group consisting of a hydrocarbon alkyl, a furyl and a phenyl nucleus and wherein the

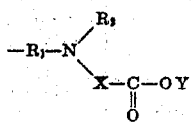

group is attached to the nucleus represented by $R_1$ in para position to the azo bond shown.

4. A cellulose acetate colored with a nuclear non-sulfonated azo dye compound having the general formula:

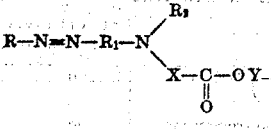

wherein R represents the residue of a member selected from the group consisting of a benzene, a naphthalene, a benzoxazole and a benzothiazole nucleus, $R_1$ represents the residue of a member selected from the group consisting of a benzene and a naphthalene nucleus containing but one benzene and naphthalene ring, respectively, $R_2$ represents a member selected from the group consisting of hydrogen, an aliphatic group, a cycloalkyl group, a furyl group, a phenyl nucleus and a

group, X represents a short chain saturated aliphatic hydrocarbon group, Y represents a member selected from the group consisting of a hydrocarbon alkyl, a furyl and a phenyl nucleus and wherein the

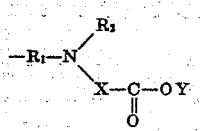

group is attached to the nucleus represented by $R_1$ in para position to the azo bond shown.

5. A cellulose acetate colored with a nuclear non-sulfonated azo dye compound having the general formula:

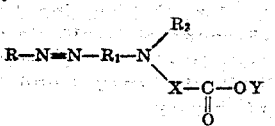

wherein R represents the residue of a benzene nucleus, $R_1$ represents the residue of a benzene nucleus containing but one benzene ring; $R_2$ represents a member selected from the group consisting of hydrogen, an aliphatic group, a cycloalkyl group, a furyl group, a phenyl nucleus and a

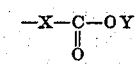

group, X represents a short chain saturated aliphatic hydrocarbon group, Y repersents a member selected from the group consisting of a hydrocarbon alkyl, a furyl and a phenyl nucleus and wherein the

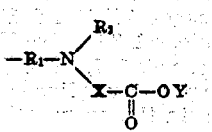

group is attached to the nucleus represented by $R_1$ in paraposition to the azo bond shown.

6. A cellulose acetate colored with a nuclear non-sulfonated azo dye compound having the general formula:

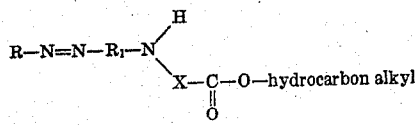

wherein R represents the residue of a benzene nucleus, $R_1$ represents the residue of a benzene nucleus containing but one benzene ring, X represents a short chain saturated aliphatic hydrocarbon group and wherein the

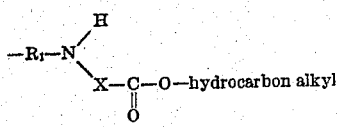

group is attached to the nucleus represented by $R_1$ in para position to the azo bond shown.

7. A cellulose acetate colored with a nuclear non-sulfonated azo dye compound having the general formula:

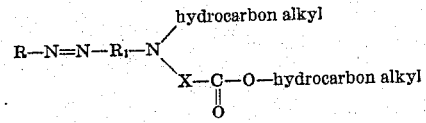

wherein R represents the residue of a benzene nucleus, $R_1$ represents the residue of a benzene nucleus containing but one benzene ring, X represents a short chain saturated aliphatic hydrocarbon group and wherein the

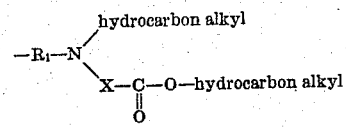

group is attached to the nucleus represented by $R_1$ in para position to the azo bond shown.

8. The azo dye compounds having the general formula:

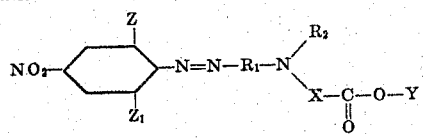

wherein Z and $Z_1$ each represents a member selected from the group consisting of hydrogen, hydroxy, a nitro group, a halogen atom, an alkyl group, a sulfone group, a sulfonamide group, a ketone group and a cyano group, $R_1$ represents the residue of a benzene nucleus containing but one benzene ring, $R_2$ represents a member selected from the group consisting of hydrogen, an aliphatic group, a cycloalkyl group, a furyl group, a phenyl nucleus and a

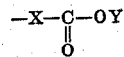

group, X represents a short chain saturated aliphatic hydrocarbon group, Y represents a member selected from the group consisting of a hydrocarbon alkyl, a furyl and a phenyl nucleus and wherein the

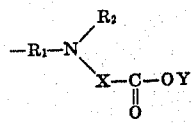

group is attached to the nucleus represented by $R_1$ in para position to the azo bond shown.

9. The azo dye compounds having the general formula:

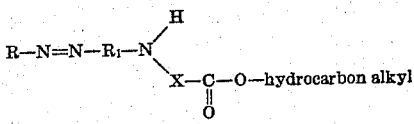

wherein R represents the residue of a benzene nucleus, $R_1$ represents a residue of a benzene nucleus containing but one benzene ring, X represents a short chain saturated aliphatic hydrocarbon group and wherein the

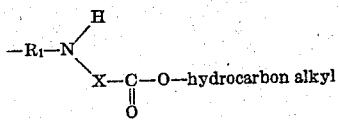

group is attached to the nucleus represented by $R_1$ in para position to the azo bond.

10. The azo dye compounds having the general formula:

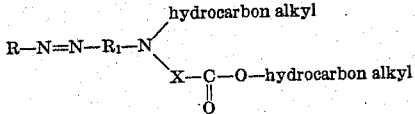

wherein R represents the residue of a benzene nucleus, $R_1$ represents the residue of a benzene nucleus containing but one benzene ring, X represents a short chain saturated aliphatic hydrocarbon group and wherein the

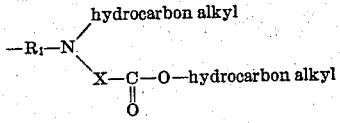

group is attached to the nucleus represented by $R_1$ in para position to the azo bond.

JAMES G. McNALLY.
JOSEPH B. DICKEY.